US010398082B2

(12) United States Patent
Rittershofer et al.

(10) Patent No.: US 10,398,082 B2
(45) Date of Patent: Sep. 3, 2019

(54) COMBINE HARVESTER WITH A STRAW CHUTE AND A STRAW CONVEYOR

(71) Applicant: Deere & Company, Moline, IL (US)

(72) Inventors: Martin Rittershofer, Kaiserslautern (DE); Oliver Klein, Saarlouis (DE); Peter Mischler, Kaiserslautern (DE); Gregor Diessner, Schweigen-Rechtenbach (DE); Volker Fuchs, Sarrebourg (DE); Christina Fries, Nohfelden (DE); Dirk Schubert, Rehweiler (DE)

(73) Assignee: DEERE & COMPANY, Moline, IL (US)

( * ) Notice: Subject to any disclaimer, the term of this patent is extended or adjusted under 35 U.S.C. 154(b) by 33 days.

(21) Appl. No.: 15/661,187

(22) Filed: Jul. 27, 2017

(65) Prior Publication Data
US 2018/0070532 A1 Mar. 15, 2018

(30) Foreign Application Priority Data

Sep. 15, 2016 (DE) .................. 10 2016 217 609

(51) Int. Cl.
A01D 41/12 (2006.01)
A01F 29/04 (2006.01)
(52) U.S. Cl.
CPC .......... A01D 41/1243 (2013.01); A01F 29/04 (2013.01)
(58) Field of Classification Search
CPC .......... A01F 12/40; A01F 29/06; A01F 29/12; A01F 29/04; A01D 41/1243; A01D 90/04
See application file for complete search history.

(56) References Cited

U.S. PATENT DOCUMENTS

| 5,833,533 | A  | * | 11/1998 | Roberg ............... A01F 12/40 460/112 |
| 6,158,571 | A  | * | 12/2000 | Gosa ............... A01D 61/008 198/613 |
| 6,685,558 | B2 | * | 2/2004  | Niermann .......... A01D 41/1243 460/111 |
| 7,731,578 | B2 | * | 6/2010  | Birrell ............... A01F 12/444 460/100 |
| 7,867,072 | B2 | * | 1/2011  | Lauwers ........... A01D 41/1243 460/112 |
| 8,092,286 | B2 | * | 1/2012  | Farley ............... A01F 12/40 460/112 |
| 9,137,949 | B2 | * | 9/2015  | Isaac ............... A01F 12/40 |
| 2003/0017861 | A1 | * | 1/2003  | Niermann .......... A01D 41/1243 460/112 |

(Continued)

FOREIGN PATENT DOCUMENTS

| DE | 102008040125 A1 | 2/2009 | |
| DE | 102012204416 A1 * | 9/2013 | ........... A01F 12/182 |

(Continued)

OTHER PUBLICATIONS

Search Report issued in counterpart application No. EP17190343.8, dated Mar. 16, 2018 (7 pages).

Primary Examiner — Arpad Fabian-Kovacs
(74) Attorney, Agent, or Firm — Michael Best & Friedrich LLP

(57) ABSTRACT

A combine harvester has a straw chute with a straw conveyor which comprises a conveyor rotor which can be set into rotation and has dogs distributed helically around the conveyor rotor.

4 Claims, 3 Drawing Sheets

(56) References Cited

U.S. PATENT DOCUMENTS

| | | | | |
|---|---|---|---|---|
| 2004/0259611 A1* | 12/2004 | Dow | ............... | A01F 12/40 460/112 |
| 2005/0282602 A1* | 12/2005 | Redekop | ............ | A01D 41/1243 460/112 |
| 2010/0048269 A1* | 2/2010 | Ricketts | ................ | A01F 12/40 460/2 |
| 2010/0291982 A1* | 11/2010 | Isaac | ................. | A01F 12/40 460/112 |
| 2013/0167497 A1* | 7/2013 | Van De Weijer | ...... | A01D 90/04 56/341 |
| 2015/0230408 A1* | 8/2015 | Pohlmann | ............... | A01F 17/00 460/112 |
| 2016/0044869 A1* | 2/2016 | Mayerle | ................. | A01F 12/40 460/1 |
| 2016/0150727 A1* | 6/2016 | Mayerle | ............ | A01D 41/1243 460/112 |
| 2016/0316635 A1* | 11/2016 | Murray | ................. | A01D 41/00 |
| 2017/0079207 A1* | 3/2017 | Puryk | ................. | A01D 41/1243 |
| 2018/0146621 A1* | 5/2018 | Montenguise | ..... | A01D 41/1243 |

FOREIGN PATENT DOCUMENTS

| | | | | |
|---|---|---|---|---|
| DE | 102013206515 A1 | 11/2013 | | |
| DE | 102014220830 B3 * | 11/2015 | ............... | A01F 7/02 |
| DE | 102014225898 A1 * | 6/2016 | ............ | A01F 15/10 |
| EP | 1040749 A1 | 10/2000 | | |
| EP | 2227940 A1 | 9/2010 | | |
| EP | 2384610 A2 * | 11/2011 | ......... | A01D 41/1243 |
| EP | 2769612 A1 | 8/2014 | | |

\* cited by examiner

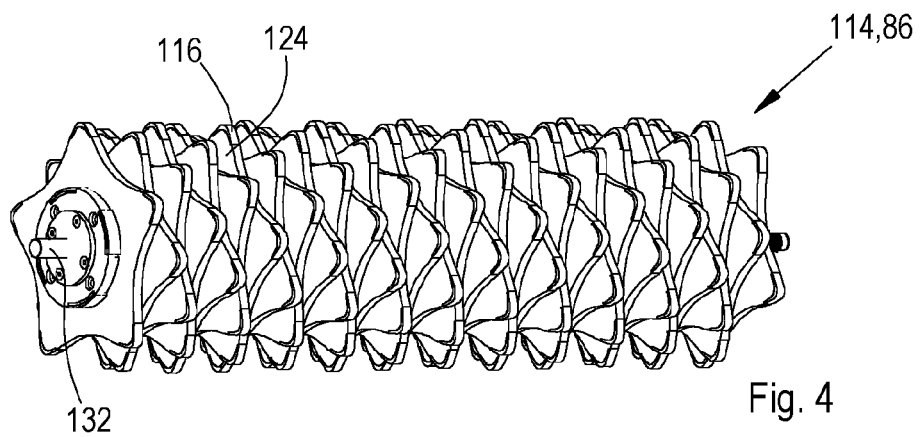
Fig. 4
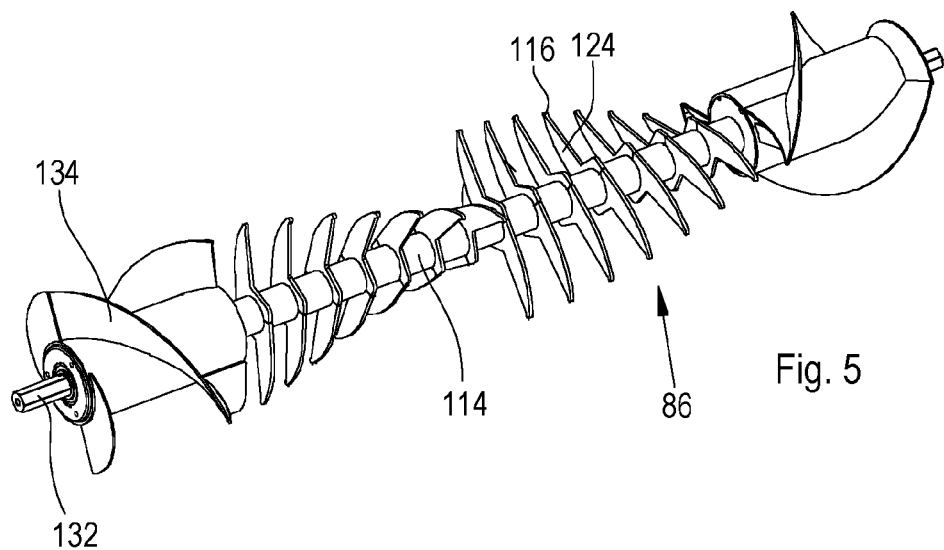
Fig. 5
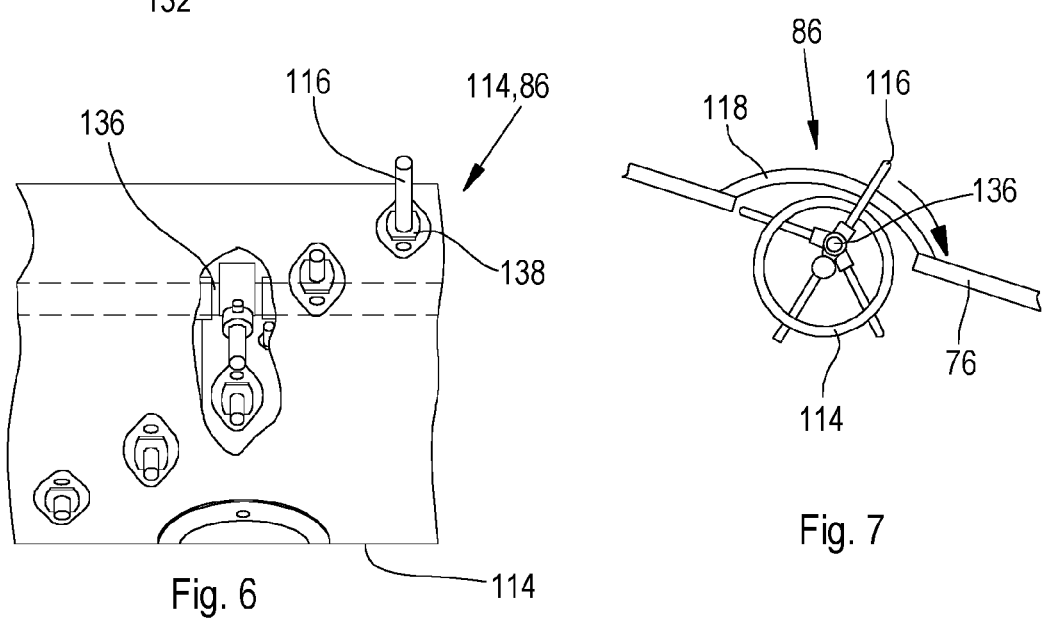
Fig. 6
Fig. 7

US 10,398,082 B2

COMBINE HARVESTER WITH A STRAW CHUTE AND A STRAW CONVEYOR

FIELD OF THE INVENTION

The invention relates to a combine harvester comprising a chassis, which is movable across a field in a forward direction, a crop processing device having an outlet for straw which is suppliable in a swath deposit operation to a straw chute and a straw conveyor which is assigned to the straw chute, conveys the straw in an undershot or overshot manner and comprises an axially extending conveyor rotor which can be set into rotation and has dogs which are distributed in the circumferential direction and in the axial direction about the conveyor rotor.

BACKGROUND OF THE INVENTION

Agricultural combine harvesters are large machines which harvest, thresh, separate and clean agriculturally cultivated grain-bearing crops. The clean grain obtained is stored in a grain tank arranged on the combine harvester. The straw removed by threshing is generally either chopped and distributed on the field across the width of the cutting section or is guided around the straw chopper and deposited on the field unchopped in a swath so that it can be picked up later by a baler. The crop residues remaining at the rearward outlet of the cleaning device, such as chaff and small pieces of straw, are distributed on the field by a chaff spreader or passed through the straw chopper and distributed on the field. The last-mentioned solution has the advantage that there is no need for a separate chaff spreader but makes it necessary to guide the straw past the rear of the straw chopper in the swath operating mode.

An example of a combine harvester of this type is described in DE 10 2005 040 125 A1 which is considered to establish the generic type. The straw output by the axial threshing and separating device is thrown to the rear by a drum conveyor. In the chopping mode, the straw impacts against a pivotable flap which conducts the straw downward into the straw chopper. The flap can be pivoted upward for the swath deposit operation in which the straw passes onto a straw chute which is arranged above the straw chopper and on which the straw slides downward and rearward and is output onto the field above the straw chopper. A straw conveyor which operates in an undershot or overshot manner and can be embodied as a drum conveyor or conveyor belt is arranged above the straw chute.

The straw deposited in the swath is intended to lie as loosely as possible so that it can possibly still dry off somewhat and can easily be collected with a material pick-up. Although the drum or belt conveyor which is known in the prior art according to DE 10 2005 040 125 A1 is capable of conveying the straw, it can scarcely loosen the straw up.

The object of the invention is providing a combine harvester of the type stated above in which the abovementioned problems occur to a reduced extent, if at all.

SUMMARY OF THE INVENTION

In accordance with a first aspect of the invention, a combine harvester is equipped with a chassis, which is movable across a field in a forward direction, a crop processing device having an outlet for straw which is suppliable in a swath deposit operation to a straw chute and a straw conveyor which is assigned to the straw chute, conveys the straw in an undershot or overshot manner and comprises an axially extending conveyor rotor which can be set into rotation and has dogs which are distributed in the circumferential direction and in the axial direction about the conveyor rotor. The dogs are distributed helically around the conveyor rotor. The effect thereby achieved is that the dogs successively comb through the straw and loosen it up.

A scraper can be arranged in each case between axially adjacent dogs.

The axis of rotation of the conveyor rotor can be arranged at least approximately level with the upper side of the straw chute, i.e. can be located in the plane of the straw chute. The scraper can extend from an end, which is arranged upstream of the conveyor rotor, in a curved manner upward and as far as to the rear of the conveyor rotor. This avoids problems with the straw winding around the conveyor rotor and the dogs.

The dogs can have a hook at the axially outer end moving ahead of them in the direction of rotation.

In an alternative arrangement, the dogs are supported on a shaft arranged eccentrically with respect to the axis of the conveyor rotor, as is known per se from dispensing conveyors of cutting mechanisms.

The conveyor rotor can be equipped on the end side with cross conveyor means for forming swath, in particular conveyor helices.

BRIEF DESCRIPTION OF THE DRAWINGS

Five exemplary embodiments of the invention are explained with reference to the drawings:

FIG. 4 shows a perspective view of a third embodiment of a straw conveyor.

FIG. 5 shows a perspective view of a fourth embodiment of a straw conveyor.

FIG. 6 shows a perspective view of a fifth embodiment of a straw conveyor.

FIG. 7 shows a vertical section through the straw conveyor of FIG. 6.

DETAILED DESCRIPTION

Figure 1:
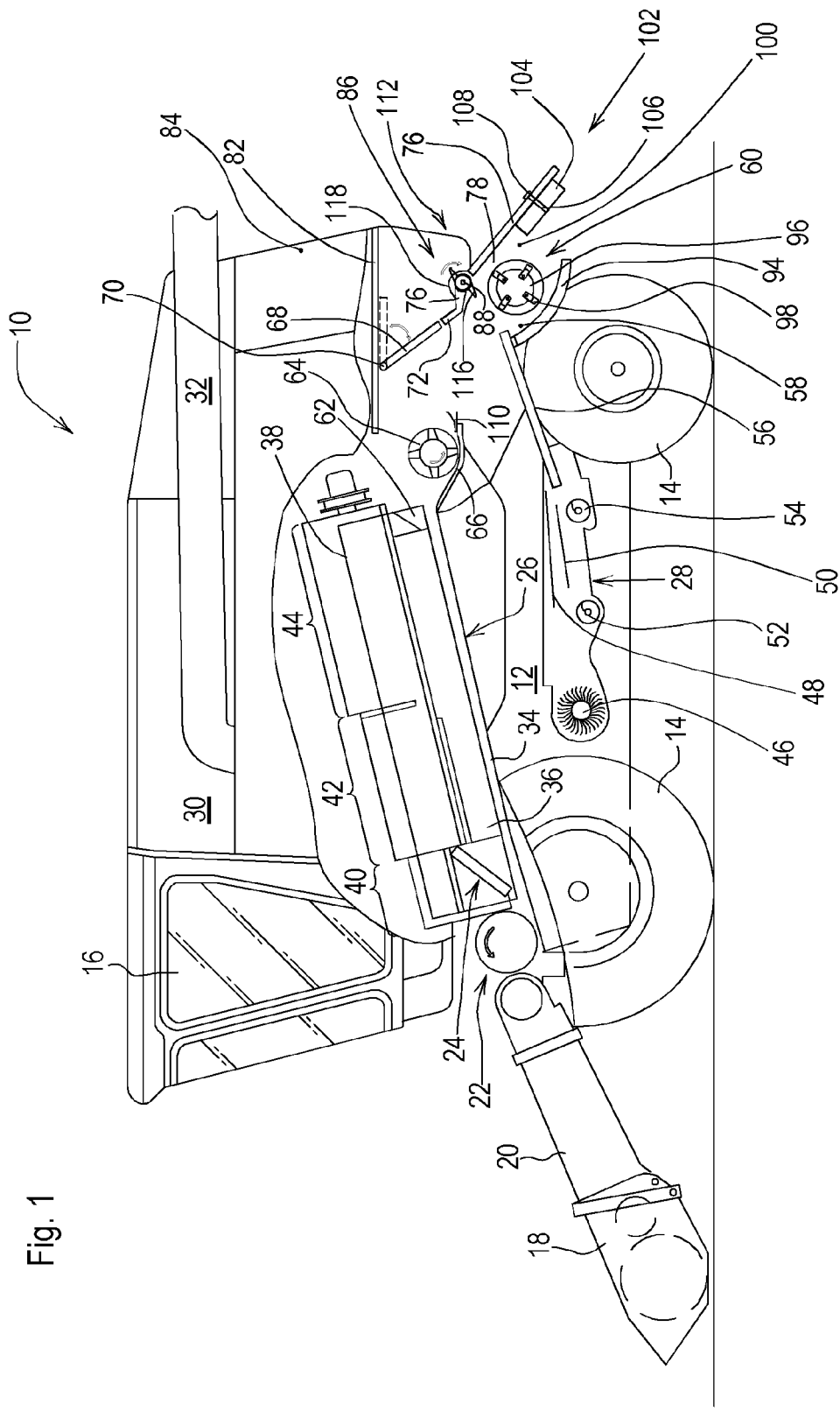
FIG. 1 shows a partially sectioned side view of a combine harvester with a straw chute and a straw conveyor assigned to the latter for conveying away the straw.

FIG. 1 shows an agricultural combine harvester 10 with a chassis 12 having wheels 14, which are in contact with the ground, are fastened to the chassis 12 and serve to drive the combine harvester 10 in a forward direction, which runs to the left in FIG. 1. Operation of the combine harvester 10 is controlled from the operator's cab 16. A cutting mechanism 18 is used to harvest a grain-containing crop and to supply it to a feeder house 20. The harvested material is supplied by the feeder house 20 to a guide drum 22. The guide drum 22 guides the crop through an inlet transitional section 24 to an axial crop processing device 26. In the text which follows, directional terms such as front and rear relate to the forward direction of the combine harvester 10.

The crop processing device 26 comprises a rotor housing 34 and a rotor 36 arranged therein. The rotor 36 comprises a hollow drum 38, to which material processing elements for a feed section 40, a threshing section 42 and a cylindrical separating section 44 are fastened. The feed section 40 is arranged on the front side of the axial crop processing device 26. The threshing section 42 and the separating section 44 are situated longitudinally downstream and to the rear of the feed section 40. In the feed section 40, the drum 38 is frusto-conical. The threshing section 42 comprises a frustoconical front section and a cylindrical rear section. The separating section 44 of the drum 38 is situated at the end of the axial crop processing device 26. An axial crop processing device 26 can also be replaced by a tangential threshing drum and an axial separating device or straw walker following it.

Grain and chaff which fall through a threshing concave associated with the threshing section 42 and through a separating grate associated with the separating section 44 are supplied to a cleaning system 28 with a fan 46 and slotted sieves 48, 50, to which an oscillating movement can be imparted. The cleaning system 28 removes the chaff and supplies the clean grain to a clean grain elevator (not shown) by means of a screw conveyor 52. The clean grain elevator deposits the clean grain in a grain tank 30. The clean grain in the grain tank 30 can be unloaded onto a grain wagon, trailer or truck by an unloading screw conveyor 32. Any remaining crop at the rear of the lower slotted sieve 50 is supplied back to the crop processing device 26 by means of a screw conveyor 54 and a tailings conveyor (not shown). The crop residues discharged at the rear end of the upper slotted sieve 48, which essentially comprise chaff and small pieces of straw, are conveyed rearwards into an inlet 58 of a straw chopper 60 by a vibratory pan conveyor 56.

Threshed straw leaving the separating section 44 is expelled from the crop processing device 26 through an outlet 62 and supplied to an ejector drum 64. The ejector drum 64, which interacts with a pan 66 arranged underneath it, throws the straw out toward the rear. To the rear of the ejector drum 64 and approximately at the vertical level of its axis of rotation, there is a flap 68 which serves for changing between a swath deposit operation and a chopping operation. An upper wall 82 extending horizontally and in the forward direction is mounted above the ejector drum 64 and the flap 68, closing off at the bottom an engine compartment 84 situated above it. The flap 68 is coupled at its front end adjacent to the ejector drum 64 to the wall 82 so as to be pivotable between a swath deposit position and a chopping position about a pivot axis 70 extending horizontally and transversely with respect to the forward direction. The flap 68 extends in its chopping position, in which it is illustrated by solid lines, obliquely to the rear and downward from the pivot axis 70. Underneath and adjoining the lower and rear end of the flap 68 without a gap is a plate 72, which is firmly connected to the chassis and merges into a straw chute 76 which extends obliquely rearward and downward and on which the straw can slide downward onto the ground in the swath deposit operation. The straw swath can also be given a desired shape by guide skids or straw guide rakes (not shown) mounted on the upper side of the straw chute 76.

The flap 68 can be pivoted about the pivot axis 70 between the chopping position, in which it is illustrated by solid lines in the figure, and a swath deposit position, in which the flap 68 is illustrated by broken lines in the figure, and extends parallel to the wall 82. A straw conveyor 86 is mounted at the beginning of the straw chute 76. The straw conveyor 86 extends horizontally and transversely with respect to the forward direction and, by means of a suitable drive, can be set into rotation about its axis of rotation 88 (on which it is fastened rotatably, but otherwise invariably in terms of position, to the chassis 12) in a direction of rotation in which it operates in an overshot manner and rotates in the clockwise direction in FIG. 1, as indicated by the arrow. A hydraulic motor is generally used for driving the straw conveyor 86.

Situated underneath the straw chute 76 is the straw chopper 60, which is made up of a housing 94 and a rotor 96, which is arranged therein, can be rotated about a horizontal axis extending transversely with respect to the forward direction and has cutter bars 98 distributed around the circumference of the rotor 96 and mounted in such a way as to oscillate. Two fans 102, of which only one can be seen in FIG. 1, are provided downstream of an outlet 100 of the straw chopper 60, said fans being arranged side by side below the straw chute 76. The fans 102 have a number of air blades 104, which are each connected rigidly to a shaft 106 extending orthogonally relative to the straw chute 76. The shaft 106 can be made to rotate by a hydraulic motor 108 in each case. In the swath deposit position, the straw chopper 60 conveys only the crop residues out of the cleaning system 28 to the fans 102, which distribute them on the ground approximately over the width of the cutting mechanism 18. It is also possible to use a number of rigid or vibrating straw guide plates arranged side by side instead of the fans 102. The straw chopper 60 could furthermore also be provided with an upper housing that is independent of the straw chute 76, and it would also be possible for the fans 102 to be fastened to this housing.

For deposition of the straw in swath form (deposition of long straw), the flap 68 can be moved into its swath deposit position (illustrated by broken lines), either manually by the operator using a suitable lever or from the operator's cab 16 by means of a power-operated drive (not shown). From the outlet 62 of the crop processing device 26, the straw is supplied to the ejector drum 64, which throws it in free flight through the opening released by the flap 68 to the straw conveyor 86. The sideways distribution of the straw can be optimized by means of preferably adjustable guide skids 110 arranged downstream of the ejector drum 64. The straw conveyor 86 is operated in an overshot manner. The straw is therefore actively conveyed rearward by the straw conveyor 86 and is conveyed along the straw chute 76, on which it slides onto the ground through a rearward ejection opening 112 of the combine harvester 10.

In the chopping position, the flap 68 is pivoted downward about the pivot axis 70 relative to the swath deposit position, as shown in FIG. 1. The straw thrown against the flap 68 by the ejector drum 64 is deflected downward by the flap 68 and falls downward into the inlet 58 of the straw chopper 60, which chops it together with the crop residues from the cleaning system 28 and distributes it on the ground by means of the fans 102. The straw conveyor 86 can be shut down during the chopping operation.

Figure 2:
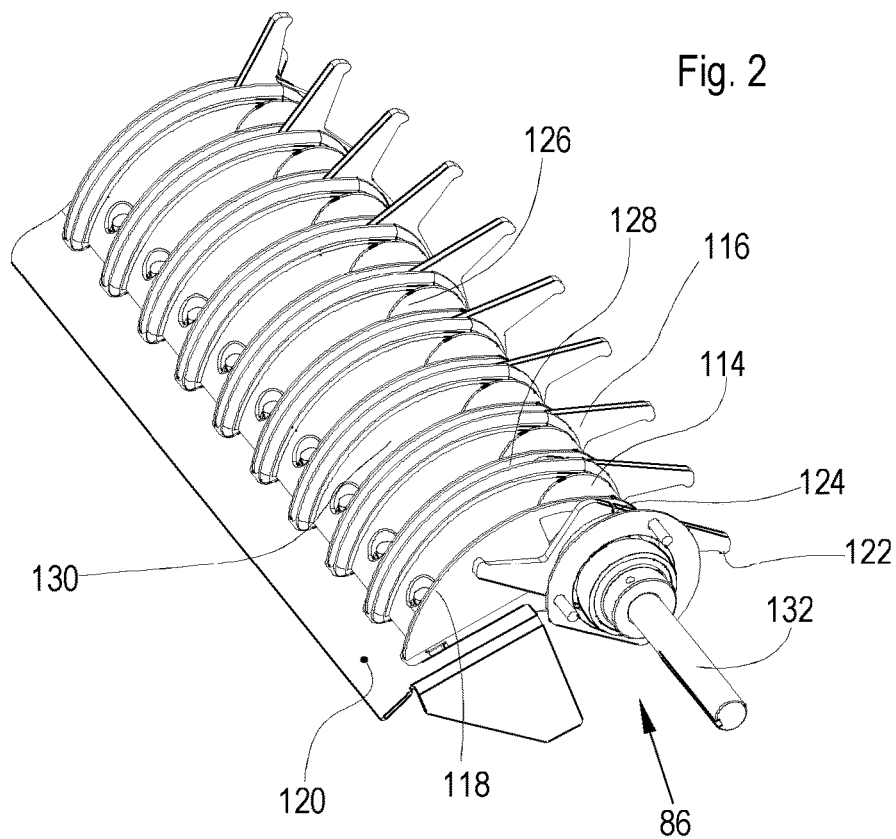
FIG. 2 shows an enlarged perspective view of the straw conveyor of FIG. 1.
Figure 3:
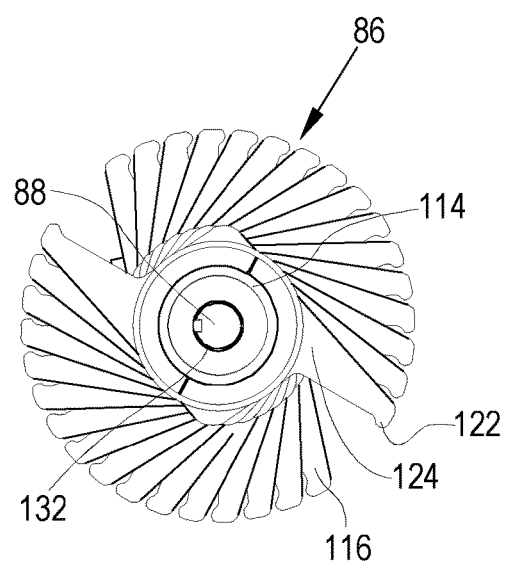
FIG. 3 shows a lateral view of the conveyor rotor of the straw conveyor from FIG. 1.

FIGS. 2 and 3 show the straw conveyor 86 of FIG. 1 in an enlarged illustration. The straw conveyor 86 comprises a conveyor rotor 114, to which conveyor disks 124 which are spaced apart in the axial direction and have dogs 116 mounted thereon are fastened. The conveyor rotor 114 is of modular construction, i.e. comprises a central shaft 132, onto which the plate-like conveyor disks 124 with the dogs 116 and cylindrical sections 126 are placed and fixed in an alternating manner. Such a conveyor rotor 114 is described, for example, in DE 10 2014 220 830 B3 and DE 10 2014 225 898 A1 and also in DE 10 2012 204 416 A1 and in the documents cited in each case therein, the disclosure of which is incorporated into the present documents by reference.

The conveyor disks 124 each comprise two dogs 116 lying diametrically opposite each other. The dogs 116 have hooks 122, which move ahead of them in the direction of rotation, at their outer ends. On the upstream side, the conveyor rotor 114 is provided with scrapers 118 which are each located between two conveyor disks 124. The scrapers 118 extend in a curved manner from a front guide plate 120, which is fastened to the straw chute 76 or to the plate 72 and could also be omitted, rearward and upward and then downward again as far as to the rear of the cylindrical sections 126. The scrapers 118 arranged on both sides of a conveyor disk 124 leave a gap 128 between them, through which the dog 116 can extend out upward. Scrapers 118 arranged in each case between two gaps 128 are connected to one another by a ramp 130 which is recessed in a trough-shaped manner in the transverse direction in relation to the scrapers 118 and rises in a curved manner in the flow direction of the crop and drops again in front of the cylindrical sections 126. The axis of rotation 88 of the conveyor rotor 114 lies approximately in the plane of the upper side of the straw chute 76 or slightly thereabove.

Figure 3A:
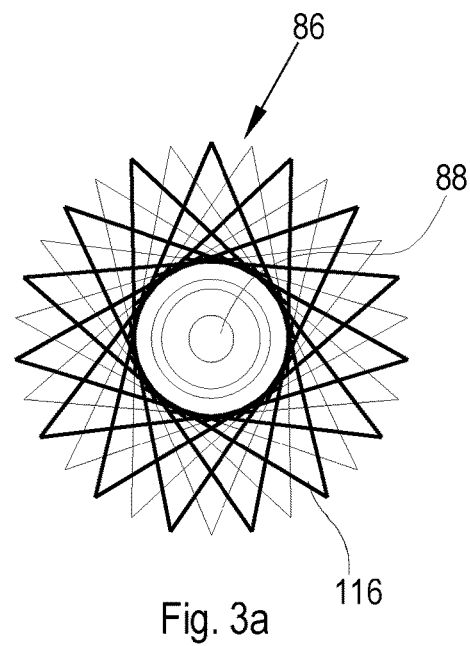
FIG. 3A shows a lateral view of a second embodiment of the conveyor rotor of the straw conveyor from FIG. 1.

As can be seen in FIG. 3, the dogs 116 are arranged helically. This results in a combing, straw-loosening action of the straw conveyor 86. The scrapers 118 (shown in FIG. 2) prevent the straw from winding around the conveyor rotor 114, to which end the ramps 130 which lift the straw and conduct it via the cylindrical sections 114 also contribute. The dogs 116 of the FIG. 3 arrangement can also be diamond-shaped, as shown in FIG. 3*a*.

FIG. 4 shows a third embodiment of a conveyor rotor 114 of a straw conveyor 86, which conveyor rotor can replace the conveyor rotor 114 of FIGS. 1 to 3. In the case of the conveyor rotor 114, the star-shaped conveyor disks 124 each comprise five dogs 116. The dogs 116 are likewise arranged helically.

FIG. 5 shows a fourth embodiment of a conveyor rotor 114 of a straw conveyor 86, which conveyor rotor can replace the conveyor rotor 114 of FIGS. 1 to 3. At the outer ends, the conveyor rotor 114 is equipped with helical cross conveyor means 134 for forming swath. For this purpose, the straw chute 76 should be provided with corresponding cutouts. The dogs 116 have rectilinear, approximately radially extending or forwardly curved leading edges. The rectilinear or curved leading edges could also be angled rearward counter to the direction of rotation, analogously to the embodiment according to FIG. 3*a*.

FIGS. 6 and 7 show a fifth embodiment of a conveyor rotor 114 of a straw conveyor 86, which conveyor rotor 114 can replace the conveyor rotor 114 of FIGS. 1 to 3. The conveyor rotor 114 comprises an eccentrically mounted, fixed shaft 136 on which the finger-shaped dogs 116 extending through guides 138 in the casing of the conveyor rotor 114 are mounted individually. Arrangements of this type are known per se from dispensing conveyors of cutting mechanisms, cf. EP 1 040 749 A1. The fingers can extend radially or can be inclined laterally in their entirety (cf. DE 10 2013 206 515 A1) or only at outer conical ends of the conveyor rotor 114 (cf. EP 2 769 612 A1) in order to form the swath. The scrapers 118 could be omitted in the fourth embodiment.

The invention claimed is:

1. A combine harvester comprising:
   a chassis, which is movable across a field in a forward direction;
   a crop processing device having an outlet for straw which is suppliable in a swath deposit operation to a straw chute; and
   a straw conveyor assigned to the straw chute, which conveys the straw in an undershot or overshot manner and includes an axially extending conveyor rotor which can be set into rotation and has dogs which are distributed in the circumferential direction and in the axial direction about the conveyor rotor, wherein the dogs are distributed helically around the conveyor rotor, and a scraper arranged in each case between axially adjacent dogs, wherein the axis of rotation of the conveyor rotor is arranged at least approximately level with an upper side of the straw chute, and wherein the scraper extends from an end arranged upstream of the conveyor rotor in a curved manner upward and as far as to the rear of the conveyor rotor.

2. The combine harvester as claimed in claim 1, wherein the dogs have a hook at the axially outer end moving ahead of them in the direction of rotation.

3. The combine harvester as claimed in claim 1, wherein the dogs are supported on a shaft arranged eccentrically with respect to the axis of rotation of the conveyor rotor.

4. The combine harvester as claimed in claim 1, wherein the conveyor rotor is equipped on the end side with cross conveyor helices for forming a swath.

* * * * *